Sept. 23, 1969  E. FRIELING  3,469,262
RADIO DIRECTION FINDER
Filed Nov. 28, 1967  2 Sheets-Sheet 1

INVENTOR
EDWARD FRIELING
BY
ATTORNEY

Sept. 23, 1969        E. FRIELING        3,469,262

RADIO DIRECTION FINDER

Filed Nov. 28, 1967        2 Sheets-Sheet 2

INVENTOR
EDWARD FRIELING
BY
ATTORNEY

United States Patent Office 3,469,262
Patented Sept. 23, 1969

3,469,262
RADIO DIRECTION FINDER
Edward Frieling, Livingston, N.J., assignor to Electronic Enterprises, Inc., Newark, N.J., a corporation of New Jersey
Filed Nov. 28, 1967, Ser. No. 686,026
Int. Cl. G01s 5/02
U.S. Cl. 343—115                                    8 Claims

ABSTRACT OF THE DISCLOSURE

A radio direction finder unit has a movable housing carrying a magnetic compass that includes a magnetized rotatable member cooperable with a marking on the housing by which the housing may be located in a predetermined orientation relative to magnetic north or south. A dial member is rotatable on the housing relative to an index for indicating azimuth angles or directions from the reference magnetic pole and a radio receiver is tunable to the frequencies of radio waves from selected transmitting stations, with at least a directional antenna of such receiver being rotatable with the dial member so that the power of radio waves collected by the antenna is dependent, at least in part, on the direction of the antenna relative to the transmitting station as shown by the dial member and index. The receiver's loudspeaker and/or a meter is used to sense variations in the power of the collected radio waves and thereby aid in disposing the antenna in a predetermined direction relative to the selected transmitting station. Such loudspeaker is positioned relative to the housing to have the axis of its magnet on a line extending through the axis of rotation of the magnetized member of the compass and the cooperating marking on the housing, and the loudspeaker magnet is polarized to supplement the effect of the earth's magnetic field on the magnetized member when the housing is in said predetermined orientation.

---

This invention relates generally to magnetic compasses and direction finders, and more particularly is directed to a magnetic compass and radio direction finder unit.

Although radio direction finders have been known for a long time and are widely employed, the existing radio direction finders are either difficult to operate with any substantial degree of accuracy or are complex and expensive and thus are not economically suited for use on small commercial vessels, pleasure craft or automobiles, or by hikers, campers and the like. Further, when existing radio direction finders are employed on a boat or vessel, the finder must be accurately located and positioned with respect to the usually remotely located compass of the boat or vessel, and, during the operation of the radio direction finder, the heading of the boat must be maintained constant, which is obviously difficult under severe weather conditions.

Accordingly, it is an object of this invention to provide radio direction finder units that are compact, portable, simple and inexpensive so as to promote the use thereof on even the smallest commercial vessels and pleasure craft, on automobiles, and by hikers, campers and the like.

A further object is to provide a radio direction finder unit having its own compass for orientation of the unit as a whole, relative to a reference magnetic pole, whereby the radio direction finder can be operated without the necessity of maintaining a constant heading of the boat, vessel or automobile by which the unit may be carried, and wherein a conventional AM, FM, short-wave or marine receiver, preferably composed of solid state components, and having an antenna with directional characteristics is employed for determining the directions from the radio direction finder to known transmitting stations, whereby the position of the craft carrying the radio direction finder can be easily plotted by triangulation.

A difficulty encountered in providing such a radio direction finder with its own magnetic compass is the effect of the loudspeaker magnet of a conventional radio receiver on the accuracy of the magnetic compass. Further, it is difficult to protect the compass thereof from the effects of magnetic structures or permeable objects that may be brought nearby when the finder is being used.

Accordingly, still another object of the invention is to provide a radio direction finder unit having the above recited characteristics, and in which the loudspeaker of the receiver used for obtaining bearings or fixes is located with respect to the compass of the unit so as to avoid any substantial adverse influence on the compass during a directional reading by reason of the magnetic field associated with the speaker, and further to minimize the influence on such compass of any magnetic objects or permeable structures brought into the vicinity of the unit during use.

In accordance with an aspect of this invention, as applied to a radio direction finder unit, the latter comprises a housing carrying a compass and being movable for disposing the housing in a predetermined orientation with respect to the magnetic north or south as determined by the compass. A dial member is rotatably mounted on the housing and calibrated to cooperate with an index on the housing for indicating directions relative to the reference magnetic pole when the housing is in such predetermined position. A radio receiver in the housing is tunable to the frequencies of radio waves transmitted by selected remote stations and has a directional antenna so that the power of radio waves collected by the antenna from a selected station is dependent on the direction of the antenna with respect to such station. At least the directional antenna of the receiver is fixed in a predetermined orientation relative to the dial member to turn with the latter. The radio receiver further has means, such as a loudspeaker for audibly reproducing the signal represented by the collected radio waves and/or a null reading meter, by which variations in the power of the collected radio waves can be sensed for determining when the antenna and hence the directional dial is in a predetermined orientation with respect to a selected station, and the loudspeaker of the radio receiver is positioned in the housing so that its magnet enhances or increases the effect of the earth's magnetic field on the compass when the housing is in the predetermined position with respect to the reference magnetic pole.

In a preferred embodiment of the invention, the directional antenna is oriented relative to the dial member so that the latter will cooperate with the index to indicate the direction to a selected station when the dial member is rotatably positioned for a null condition in the power of radio waves collected by the antenna. Thus, where variations in the power of the collected waves are audibly sensed through a loudspeaker of the radio receiver, such receiver is initially tuned to a selected station and the direction indicating dial member is then turned until the audible signal from the loudspeaker fades to a minimum, whereupon the indication given by the dial member and index represents the direction to the station for which the receiver has been tuned.

It is another feature of this invention to dispose the loudspeaker of the radio receiver within the housing so that the north or south seeking pole of its magnet is in line with the compass needle or magnetized member to attract the south or north seeking pole, respectively, of such needle when the housing is in the predetermined orientation with respect to the reference magnetic pole. In a preferred embodiment, the loudspeaker is disposed concentric with the axis of rotation of the dial member and the compass is disposed to indicate magnetic north or south along a line which diametrically intersects the axis of rotation of the dial member.

The above, and other objects, features and advantages of the invention, will be apparent in the following detailed description of illustrative embodiments thereof which is to be read in connection with the accompanying drawing, wherein.

Figure 1:
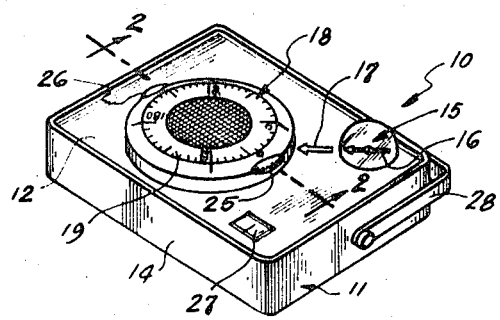
FIG. 1 is a perspective view of a radio direction finder unit in accordance with this invention.

Referring to FIG. 1 in detail, it will be seen that a radio direction finder unit 10 to which this invention is applied generally comprises a support in the form of a housing 11 for containing all of the components of the finder unit and adapted to rest upon a horizontal supporting surface, for example, in a small commercial vessel or pleasure craft or an automotive vehicle, so that the housing 11 may be bodily rotated in a substantially horizontal plane for varying its orientation with respect to magnetic north. The housing 11 is shown to include a deck or upper wall 12, a bottom wall 13 (FIG. 2) and a peripheral or side wall 14 (FIGS. 1 and 3). Mounted on the top wall or deck 12 of housing 11 is a magnetic compass 15 having a magnetized member, for example, in the form of a pointer or needle 16 the ends of which are always directed substantially toward magnetic north and south, respectively. An index 17 is inscribed or otherwise applied to deck 12 adjacent compass 15. Thus, housing 11 may be bodily rotated in a horizontal plane to align the north seeking end of pointer 16 with index 17, as shown on FIGS. 1 and 3, in order to locate housing 11 in a predetermined position or orientation relative to magnetic north.

A dial member 18 is mounted on housing 11 for rotation about a vertical axis Y—Y (FIG. 2) in a horizontal plane disposed immediately above deck 12, and the upper surface of dial member 18 is inscribed adjacent its periphery with a scale 19 calibrated to represent 360° and to cooperate with index 17 for indicating directions from magnetic north.

Figure 2:
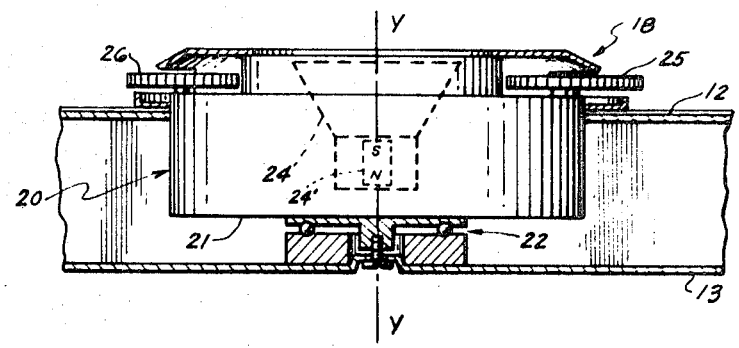
FIG. 2 is an enlarged, fragmentary sectional view taken along the line 2—2 on FIG. 1.
Figure 3:
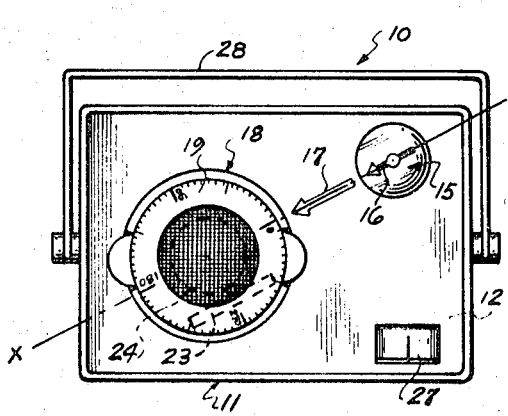
FIG. 3 is a top plan view of the radio direction finder unit of FIG. 1.

The radio direction finder 10 further comprises a conventional AM, FM short wave or marine radio receiver 20 (FIG. 2) which, in the embodiment of FIGS. 1, 2 and 3, is wholly contained in a casing 21 fixed to dial member 18 below the latter for rotation with the dial member. As shown, the mounting of receiver casing 21 for rotation with dial member 18 may be constituted by a suitable bearing 22 supported on bottom wall 13 of housing 11 (FIG. 2).

Receiver 20 may be powered by batteries contained in casing 21 or by an external source of current and includes a directional antenna 23 (shown in broken lines on FIG. 3) for collecting radio waves from various remote transmitting stations. Receiver 20 further has conventional tuning and detecting components (not shown) which respectively select the frequencies of the radio waves, or station to be received while rejecting all others, and change the energy of the collected radio waves to a form suitable for operating a reproducer, for example, in the form of a conventional loudspeaker 24 (shown in broken lines on FIGS. 2 and 3). The receiver 20 also has conventional controls which, in the simplest form of receiver, include a tuning control 25 for selecting the station to be received and an on-off and volume control 26 for adjusting the volume of the reproduced sound issuing from speaker 24. When the entire receiver 20 is rotatable with dial member 18, as shown on FIGS. 1, 2 and 3, the controls 25 and 26 may be conveniently provided as knobs projecting from dial member 18.

Since antenna 23 has directional characteristics, the power of radio waves collected by such antenna from any selected transmitting station is dependent, at least in part, on the direction of antenna 23 relative to the selected station. As shown on FIG. 3, antenna 23 is preferably mounted with respect to dial member 18 to extend parallel to a diametrical line X—X extending across dial member 18 through the "zero" degree indication on scale 19 so that such scale and index 17 will cooperate to indicate the angle from magnetic north to a selected station when there is a null in the power of the signals collected by the antenna from such station.

The loudspeaker 24 of receiver 20 is shown mounted with its magnet 24' substantially coaxial with the axis of rotation Y—Y so that the magnetic field of the speaker is symmetrical about the axis of rotation. Thus, when housing 11 is positioned to align compass pointer or needle 16 with index 17, such pointer 16 is directed toward the axis of rotation of dial member 18 about which the magnetic field of loudspeaker 24 is symmetrical, whereby rotation of receiver 20 with dial member 18 will not distort the compass field and hence will not disturb the indication of magnetic north by the compass.

It is also to be noted that, in accordance with this invention, the magnet 24' is disposed so that, when housing 11 is in the predetermined position with respect to the reference magnetic pole as determined by alignment of needle 16 with index 17, the pole of magnet 24' which is closest to the plane of rotation of needle 16 has a polarity opposed to that at the end of the needle directed toward the speaker axis. Thus, the speaker field fortifies the effect of the earth's magnetic field on needle 16 and thereby minimizes the effect of adjacent magnetic articles or structures on needle 16 as it indicates the reference magnetic pole.

The radio direction finder 10 operates as follows:

Initially, housing 11 is positionally adjusted to align pointer or needle 16 of compass 15 with index 17, and thereby disposing housing 11 in a predetermined orientation relative to magnetic north. Thereafter, without moving housing 11, receiver 20 is tuned by manipulation of control knob 25 so as to receive and reproduce by loudspeaker 24 the signals broadcast by a selected transmitting station at a known position. The volume control 26 of receiver 20 is adjusted so that the signal from the selected station is reproduced with a substantial volume. Then, while still holding housing 11 against displacement, dial member 18 is turned to similarly rotate directional antenna 23 until a null condition is attained, that is, until there is substantial fading of the signal reproduced by speaker 24. When such null condition is sensed either audibly, as by the speaker 24, or visually, as by a suitable null reading meter 27 of the type usually employed in radio receivers for indicating tuning accuracy, the degree reading on scale 19 at the position of index 17 is noted, and such degree reading directly indicates the direction relative to magnetic north from the radio direction finder to the selected transmitting station at a known position without the necessity of adding or subtracting a compass reading. The foregoing procedure may then be repeated with another transmitting station at a known position to obtain the direction from the vessel to such other station, whereupon the actual position of the vessel can be plotted by triangulation.

In the above description of the arrangement and operation of radio direction finder 10, it has been assumed that compass 15 and index 17 cooperate to establish a predetermined position of housing 11 relative to magnetic north and that the readings obtained from the cooperation of the scale 19 on dial member 18 with index 17 indicate the angles from magnetic north to the selected transmitting stations. However, it is apparent that compass 15 can be employed, if desired, for establishing housing 11 in a predetermined position relative to magnetic south and that the readings determined from dial member 18 may indicate the angle from magnetic south to the selected transmitting stations.

Figure 4:
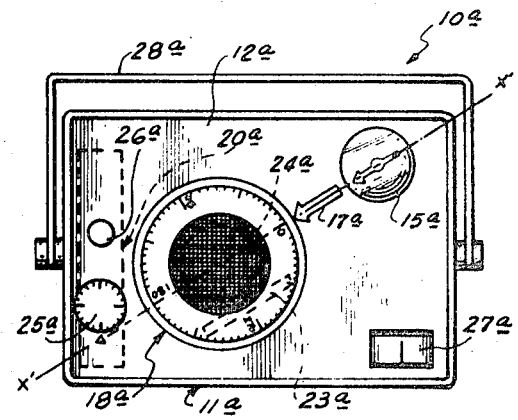
FIG. 4 is a view similar to that of FIG. 3, but showing another embodiment of this invention.

Although the entire receiver 20 has been mounted for rotation with dial member 18 in radio direction finder unit 10, it is only necessary that the directional antenna of the receiver be rotatable with the dial member. Thus, as shown on FIG. 4, a radio direction finder unit 10a in accordance with this invention which is generally similar to that previously described and has its several parts identified by corresponding reference numerals with the letter a appended thereto, is provided with a radio receiver 20a shown in broken lines as being fixedly mounted within housing 11a at the side of dial member 18a remote from compass 15a, and with its directional antenna 23a mounted for rotation with dial member 18a. Loudspeaker 24a is shown disposed coaxial with the axis of rotation of the dial member to avoid an adverse influence on the indication by compass 15a of either magnetic north or south, and such loudspeaker 24a may either rotate with dial member 18a or be fixed relative to the housing. Since the receiver 20a, with the exception of its antenna 23a and also possibly its loudspeaker 24a, is mounted apart from dial member 18a, the knobs 25a and 26a for tuning the receiver and for controlling the volume and actuating the usual on-off switch, respectively, can merely extend through deck 12a of housing 11a.

Figure 5:
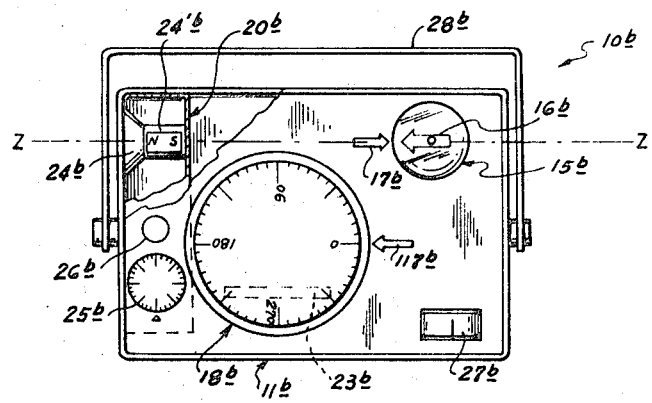
FIG. 5 is another view similar to FIG. 3 and showing a modification of the arrangement of FIG. 4.

In each of the units 10 and 10a described above, the north-south axis of the needle or other magnetized member of the compass extends through the axis of rotation of dial member 18 or 18a when the unit housing is in the desired orientation with respect to the reference magnetic pole as determined by the registration of the compass needle with the index 17 and, thus, in accordance with this invention, the loudspeaker magnet has been disposed with its axis in the line X—X which extends through the axis of rotation of the dial member, the index 17 and the axis of rotation of the needle or other magnetized member of compass 15 or 15a. However, as shown on FIG. 5, a radio direction finder unit 10b in accordance with this invention, and which has its several parts identified by the same reference numerals used to identify corresponding parts in the unit 10, but with the letter b appended thereto, may have the axis of rotation of its dial member 18b offset with respect to the north-south axis Z—Z of the needle 16b of compass 15b when the housing 11b is in the desired orientation with respect to the reference magnetic pole as determined by the registration of compass needle 16b with an index or marking 17b. In such case, a separate or individual index 117b is provided on housing 11b for cooperation with dial member 18b, and such index 117b is located s> that a line extending diametrically through the axis of rotation of dial member 18b and through index 117b is parallel with a diametrical line extending from the axis of rotation of needle 16b through the index 17b, that is, parallel with the north-south needle axis Z—Z when the housing is in the desired orientation, as shown.

In order that the magnetic field of the loudspeaker 24b of receiver 20b will not deflect the magnetic compass 15b from the reference magnetic pole, and, in fact, will protect it from deflection by nearby magnetic objects, such loudspeaker 24b is shown arranged with its magnet 24'b positioned to have its north-south axis in line with the north-south axis Z—Z of needle 16b when housing 11b is in the desired orientation where needle 16b points to index 17b. Further, it will be seen that the south pole of magnet 24'b is directed toward compass needle 16b, assuming that the north-seeking pole of needle 16b is directed toward index 17b, whereby magnet 24'b fortifies the effect of the earth's magnetic field on compass needle 16b when index 17b is aligned with the latter, and thus minimizes the effect of nearby magnetic objects on the orientation of needle 16b toward magnetic north.

When the receiver 20, 20a or 20b has solid state components and circuitry, the dimensions and weight of the radio direction finder unit, including batteries for powering the receiver, may be kept so small as to make the unit easily portable, for example, by a handle 28, 28a or 28b pivoted on the housing. In a practical embodiment of this invention, the entire radio direction finder unit measures only 1¾" x 5" x 6½" and weighs less than one pound. Thus, such unit is portable and completely suitable for use on even the smallest pleasure boats, in automobiles, or by hikers, campers and hunters.

Further, there is no need to install the finder unit in a particular location and orientation relative to the usual compass of the boat, as the unit includes a compass 15 or 15a as an integral part thereof. When operating the radio direction finder, the latter is bodily displaced to the predetermined orientation relative to magnetic north or south, as indicated by its compass 15 or 15a, and such orientation can be easily maintained during the reading of the direction indicating dial member 18 or 18a without reference to the heading of the boat or vehicle itself by which the unit may be carried. This is to be contrasted with existing radio direction finders which require that the heading of the boat itself be maintained constant while taking readings.

In the foregoing, the invention, has been described with reference to radio direction finder units in which the magnet of a loudspeaker included in a radio receiver thereof is located relative to a magnetic compass of the unit to protect the latter from nearby magnetic or permeable objects that would otherwise adversely affect the indication by such compass of a reference magnetic pole. However, this invention can also be applied to magnetic compasses that are not included in radio direction finder units.

Although illustrative embodiments of this invention have been described in detail herein with reference to the accompanying drawing, it is to be noted that the invention is not limited to those precise embodiments, and that various changes and modifications may be effected therein by one skilled in the art without departing from the scope or spirit of the invention as defined in the appended claims.

What is claimed is:

1. A portable radio direction finder comprising: a support, a compass on said support having a magnetic needle rotatable about an axis, a radio receiver on said support including a directional antenna connected to the R.F. input thereof and a speaker of the permanent magnet type connected to the audio output thereof, direction seeking means rotatably mounted on said support, respective means on said support and on said direction seeking means cooperating to indicate the relative angular positions thereof, said antenna being rotatable with said direction seeking means for finding the direction of a radio signal, and an index on said support for alignment with said compass needle to orient said support in a predetermined angular position relative to the earth's magnetic field during a directional determination, said speaker magnet being aligned with said index and the axis of compass needle rotation so that the horizontal component of any force exerted on said compass needle by said speaker magnet is colinear with the horizontal component of the force exerted on said compass needle by the earth's magnetic field when said support is in said predetermined angular position, whereby said speaker magnet imposes no angular deviation upon said compass needle when said direction finder is being used for a directional determination.

2. The invention of claim 1 wherein: one pole of said speaker magnet is nearer to said compass needle than the opposite pole thereof; said nearer pole of said speaker magnet, and the pole of said compass needle which is nearer to said speaker magnet when said support is in said predetermined angular position, being of opposite polarities, whereby to protect said compass needle from perturbation during use by permeable or magnetic objects brought into proximity therewith after said support has been put in said predetermined angular position.

3. The invention of claim 1 wherein: said speaker magnet is oriented relative to said support so that its polar axis is substantially vertical when said support is in said predetermined angular position.

4. The invention of claim 3 wherein: said speaker is mounted for rotation with said direction seeking means, the polar axis of said speaker magnet being substantially colinear with the axis of rotation of said direction seeking means, whereby substantially to preclude compass needle deviations which vary as a function of the angular position of said direction seeking means.

5. The invention of claim 3 wherein: one pole of said speaker magnet is nearer to said compass needle than the opposite pole thereof; said nearer speaker magnet pole, and the compass needle pole which is nearer to said speaker magnet when said support is in said predetermined angular position, being of opposite polarities, whereby to protect said compass needle from perturbation during use by permeable or magnetic objects brought into proximity therewith after said support has been put in said predetermined angular position.

6. The invention of claim 1 wherein: said speaker magnet is positioned relative to said support so that the field thereof has a component colinear with the earth's magnetic field when said support is in said predetermined angular position.

7. The invention of claim 6 wherein: said colinear component is poled so as to aid the earth's magnetic field when said support is in said predetermined angular position, whereby to protect said compass needle from perturbation during use by permeable or magnetic objects brought into proximity therewith after said support has been put in said predetermined angular position.

8. A portable radio direction finder comprising: a support, a compass on said support having a magnetic needle rotatable about an axis, a radio receiver including a directional antenna connected to the R.F. input thereof and a speaker of the permanent magnet type connected to the audio output thereof, direction seeking means rotatably mounted on said support, respective means on said support and on said direction seeking means cooperating to indicate their relative angular positions, said radio receiver being rotatable with said direction seeking means and said antenna being rotatable with said radio receiver for finding the direction of a radio signal, and an index on said support for alignment with said compass needle to orient said support in a predetermined angular position relative to the earth's magnetic field during a directional determination, said speaker being mounted on said radio receiver for rotation therewith and being oriented for said speaker magnet to be aligned with said index and the axis of compass needle rotation so that the horizontal component of any force exerted on said compass needle by said speaker magnet is colinear with the horizontal component of the force exerted on said compass needle by the earth's magnetic field when said support is in said predetermined angular position, whereby said speaker magnet imposes no angular deviation upon said compass needle when said direction finder is being used for a directional determination, the polar axis of said speaker magnet being substantially colinear with the axis of rotation of said direction seeking means whereby substantially to preclude compass needle deviations which vary as a function of angular position of said direction seeking means, one pole of said speaker magnet being nearer to said compass needle than the opposite pole thereof, said nearer pole of said speaker magnet and the pole of said compass needle which is nearer to said speaker magnet when said support is in said predetermined angular position being of opposite polarities whereby to protect said compass needle from perturbation during use by permeable or magnetic objects brought into proximity therewith after said support has been put in said predetermined angular position.

References Cited
UNITED STATES PATENTS 2,311,952 2/1943 Martin _____ 33—225 X
3,115,635 12/1963 Leeming et al.

RODNEY D. BENNETT, JR., Primary Examiner

RICHARD E. BERGER, Assistant Examiner

U.S. Cl. X.R.
33—225